United States Patent [19]
Speer

[11] 3,887,413
[45] June 3, 1975

[54] METHOD FOR REPAIRING PLASTIC MATERIALS

[75] Inventor: Lawrence Speer, Barbertown, N.J.

[73] Assignee: Vinyltron Corporation, Amsterdam, N.Y.

[22] Filed: Aug. 7, 1973

[21] Appl. No.: 386,345

[52] U.S. Cl............... 156/94; 106/DIG. 4; 117/2 R; 117/6; 252/62; 264/36; 432/42; 432/65
[51] Int. Cl............................................. B32b 35/00
[58] Field of Search .......... 117/2 R, 5.5, 25, 6, 142, 117/33; 264/36; 156/94, 98; 106/DIG. 4; 252/62; 432/42, 65

[56] References Cited
UNITED STATES PATENTS

| 2,005,356 | 6/1935 | Toohey et al. | 252/62 |
| 2,071,452 | 2/1937 | Bloch | 106/DIG. 4 |
| 2,433,193 | 12/1947 | Bechtner | 252/62 |
| 3,457,129 | 7/1969 | Butcher | 156/94 |
| 3,713,926 | 1/1973 | Speer | 156/98 |
| 3,783,073 | 1/1974 | Warnbers | 156/323 X |

Primary Examiner—Edward G. Whitby
Attorney, Agent, or Firm—Fay & Sharpe

[57] ABSTRACT

A heat-activated process for forming a patch for plastic and leather-like materials employs a protective coating around the patched area to avoid damage due to the heating step.

7 Claims, 3 Drawing Figures

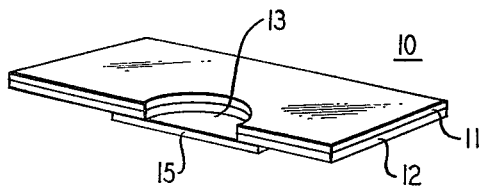
FIG. 1
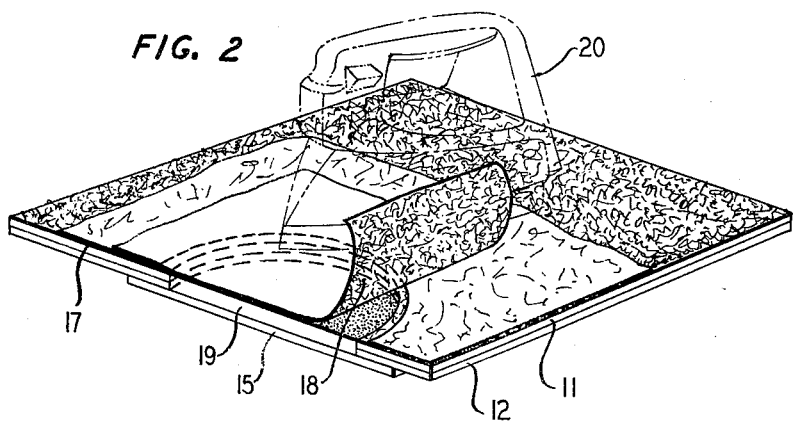
FIG. 2
FIG. 3
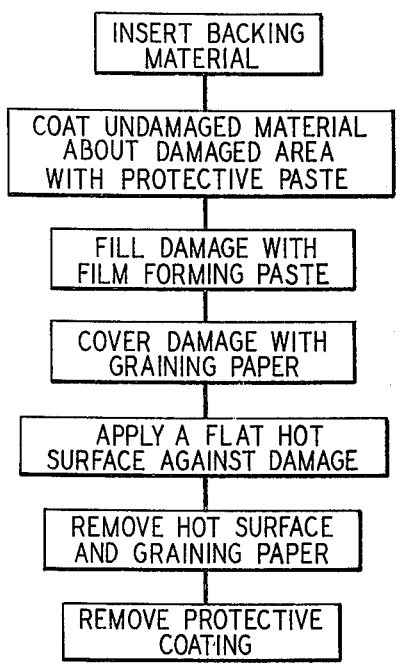

METHOD FOR REPAIRING PLASTIC MATERIALS

Field of the Invention

This invention relates to methods for repairing damages in materials such as plastics and leather and the like.

Background of the Invention

Attention has been directed, in the past, to the patching of materials which are secured in place such as is the case with upholstered furniture and billiard table cloth. The incentive for such attention, of course, arises not only because of the cost of replacement of the material involved, but also because of frequent inability to obtain identical replacement material and because of the cost of replacement labor.

There are a variety of prior art techniques for repairing such materials in situ. Most require an adhesive backing material for forming a void into which material including fibers to match the repaired material is disposed. In some techniques, laminate patches are preformed to be cemented into place. Such techniques are perhaps adequate for fabrics which are secured in place as, for example, billiard table cloths, where little movement of the repaired material is possible. Experience, on the other hand, indicates that such techniques are not well suited for materials which are intended for movement under pressure as is the case with upholstered furniture.

The failure of prior art techniques is particularly apparent with plastic materials such as leatherettes and, of course, leather which the plastics so closely imitate. These materials not only have smooth and often glossy finishes which make repairs obvious, but are intended to stretch in use thus taxing the structural capabilities of any patch with less flexible properties.

In my U.S. Pat. No. 3,713,926 issued Jan. 30, 1973, I disclose a plastic repair procedure in which a plastic film forming material, in paste form, is covered with graining paper. The graining paper functions, with the surrounding undamaged portion of the plastic and with an adhesive backing material, to form a mold in which the paste is cured in the presence of heat. The heat is supplied by a flat hot surface which functions to compress the mold as it cures the patch.

A problem arises when the flat hot surface is pressed against the patch. If the flat hot surface comprises the face of a familiar household iron, the iron is sufficiently large to extend beyond the typical piece of graining paper and the face frequently removes the graining from the formerly undamaged material surrounding the patch and beyond the graining paper. This undesirable result can occur, to a lesser extent, even through the graining paper. Further, different types of plastics react differently to heat. Some melt irreversibly when exposed to the flat hot surface. This too can occur through the vinyl release paper.

One solution to this problem is to employ a small special iron to avoid heating large areas of the undamaged material, and to move the iron with respect to the vinyl release paper. Indeed, repair kits, presently being sold, include soldering irons with disc-like tips which provide heat over a circular area of about an inch, well within the confines of the typical graining paper. With a little practice, very successful patches are achieved by movement of an instrument of this type with respect to the graining paper. But such an instrument is expensive, particularly if it includes a thermostat to regulate the temperature of the tips to an acceptable 300°–350° F. Unregulated irons, on the other hand, when plugged in, increase in temperature relatively quickly to a sufficiently high temperature to cause discoloration of the undamaged plastic. Of course, the graining paper, commonly called "vinyl-release" paper, is opaque and does not allow visual inspection of the curing process. Accordingly, it is difficult to guard against discoloration. Frequently, a perfect patch is formed in the middle of an area of discoloration.

The special iron avoids the discoloration problem for the most part particularly as long as the iron is moved quickly with respect to the graining paper.

BRIEF DESCRIPTION OF THE INVENTION

In accordance with the present invention, the undamaged material surrounding a damage to be repaired by a heat-responsive, plastic repair procedure is preconditioned to avoid damage resulting from contact with the requisite hot flat surface which cures the patch whether or not a special iron is used. Preconditioning is achieved by rubbing a paste comprising a mixture of Bentonite and talc (both clay derivatives) in water onto the undamaged material around the damage prior to filling the damaged area with the repair forming paste. The preconditioning paste insulates the plastic from the heat of the iron and allows a patch to be cured in situ without discoloration or loss of graining even if the flat, hot surface remains unmoved against the protected undamaged plastic during the patch curing process.

BRIEF DESCRIPTION OF THE DRAWING

FIG. 1 shows a projection view, partially in cross section, of a damaged area in a material prepared for repair in accordance with the method of this invention;

FIG. 2 shows a projection view, partially in cross section of a patch being formed in the damaged area of FIG. 1; and FIG. 3 is a flow diagram of a repair procedure in accordance with this invention.

DETAILED DESCRIPTION

The class of materials under consideration are plastics and leather. Inasmuch as plastics have been made indistinguishable from leather, plastic repairs in accordance with this invention are completely adaptable to the latter.

Plastic films are available commercially both with and without a backing material which imparts to the plastic some resistance to damage. Better grade plastics not only are thicker gauge but are backed by such backing materials which impart the qualities of genuine leather to the plastic particularly when the plastic is embossed to imitate a leather grain. This embossing of the plastic is accomplished by a release paper which is rolled over the plastic yard goods and heated under pressure therewith during manufacture. It is contemplated to employ both a backing material and the release paper in the practice of the method of this invention.

FIG. 1 shows a material 10 having a vinyl face 11 on a flexible backing material 12. A damaged area 13 in material 10 is shown trimmed to a circular shape in the figure. A backing material 15 is shown in place beneath the damaged area as viewed.

In accordance with the present invention, the area of undamaged material around the damaged area is coated with a protective material typically a paste of a silica clay such as Bentonite mixed with talc in water. It is particularly considered a departure in the art to employ such a paste to preserve the decorative graining of plastic material in the presence of a flat hot surface necessary for forming an equally decorative graining in a patch in the plastics.

FIG. 2 shows a protective coating 17 extending from partially beneath to beyond a graining paper 18. The paper can be seen to cover the damage area shown filled, in FIG. 2, with patching compound 19. Household iron 20 is shown in fixed position overlying the damaged area and extending beyond graining paper 18. Although iron 20 may be moved during the curing step, no movment is necessary. The iron may be pressed against the patch without damage to the coated material for more than enough time for the patching compound to cure. A period of about 45 seconds is required for curing the patching compound.

It is important to note that the protective coating extends beneath the area covered by the graining paper preferably to within one-eighth inch of the edge of the damage. The coating also extends over all the material which is to be in contact with the iron during the curing process especially that portion of the material not covered by the vinyl release paper.

FIG. 3 is a flow diagram of the method of this invention. The starting point is a trimmed damaged area with loose fibers removed. A coating of protective material is wiped onto the surface of the material with a dry cloth a finger or a spatula. In one specific embodiment, the protective coating is a heat insulating layer, comprising Bentonite, 50% by weight mixed with talc 50% by weight in water, is rubbed onto the surface of the material. Either prior to the coating step or subsequent to this step, an adhesive backing member is inserted beneath the damaged area to form a void for receiving the patching compound. These steps are represented by the top two blocks of FIG. 3.

The void formed by the undamaged material and the backing material is filled with the patching compound in the next step as represented by the third block from the top of FIG. 3. This is followed by the positioning of the graining paper as indicated by the fourth block.

Thereafter, a flat hot surface is placed against the graining paper over the damaged area until the patching compound is cured.

The iron is removed as is the graining paper and the protective coating is then wiped away as indicated by the bottom three blocks in FIG. 3. No discoloration of the surface of the plastic occurs either beneath the graining paper or in areas where the iron contacts the plastic material directly through the protective coating for periods of several minutes well beyond the (typically) less than a minute duration necessary for the curing process.

My aforementioned patent describes the film forming patching compound in detail. One example is repeated here for convenience. Specifically, a polyvinyl chloride acetate (viz., a finely divided resin), 70% by weight is mixed with a plasticizer such as diethylhexyl pthalate, 30% by weight to form a film forming paste. The insulating paste is conveniently equal parts of Bentonite and talc in water. The consistency of the resulting paste is typically almost that of toothpaste. The talc gives body to the paste; Bentonite accepts water.

Vinyl or leather surfaces repaired in accordance with this invention are virtually indistinguishable from like undamaged vinyl or leather. The reason for this is not only because a like vinyl film is formed and that surface textures can be duplicated but also because the ingredients or mixture materials are available in a large number of colors. Accordingly, any original material color can be duplicated also.

What is claimed is:

1. In a process for repairing a damage in plastic or leather-like materials in which heat curable, film-forming patching compounds are covered by a graining layer and heated with a flat hot surface at a temperature and for a time to cure the patching compound, the step of coating the undamaged material around said damage with a heat insulating paste.

2. A process for repairing a damage in plastic or leather-like fabrics comprising the steps of placing a backing member in contact with the material to be repaired for defining a void with the edges of said damage, coating the undamaged material surrounding said damage with a heat insulating paste, filling said void with a mixture of a film forming material and a plasticizer, covering said void with a vinyl release paper, applying a flat hot surface to the vinyl release paper for a time and at a temperature to cure said mixture, and removing said flat surface said paper and said coating.

3. A process in accordance with claim 2 wherein said mixture includes a Polyvinyl acetate, said flat surface is at a temperature of about 300° to 350° F, and said time is less than about a minute.

4. A process in accordance with claim 3 wherein said mixture comprises about 70% polyvinyl chloride acetate and 30% plasticizer by weight.

5. A process in accordance with claim 3 wherein said plasticizer comprises diethylhexyl phthalate.

6. A process for repairing a damage in plastic or leather-like fabrics comprising the steps of placing a backing member in contact with the material to be repaired for defining a void with the edges of said damage, coating the undamaged material surrounding said damage with a heat insulating paste, filling said void with a mixture of a film forming material and a plasticizer, covering said void with a vinyl release paper, applying a flat hot surface to the vinyl release paper for a time and at a temperature to cure said mixture and removing said flat surface, said paper and said coating, wherein said heat insulating paste comprises a mixture of Bentonite and talc in water.

7. A process in accordance with claim 6 wherein said paste includes a mixture of Bentonite (50% by weight) and talc (50% by weight).

* * * * *